(No Model.)
J. P. CRUTCHER.
VINE SUPPORT.
No. 358,596. Patented Mar. 1, 1887.
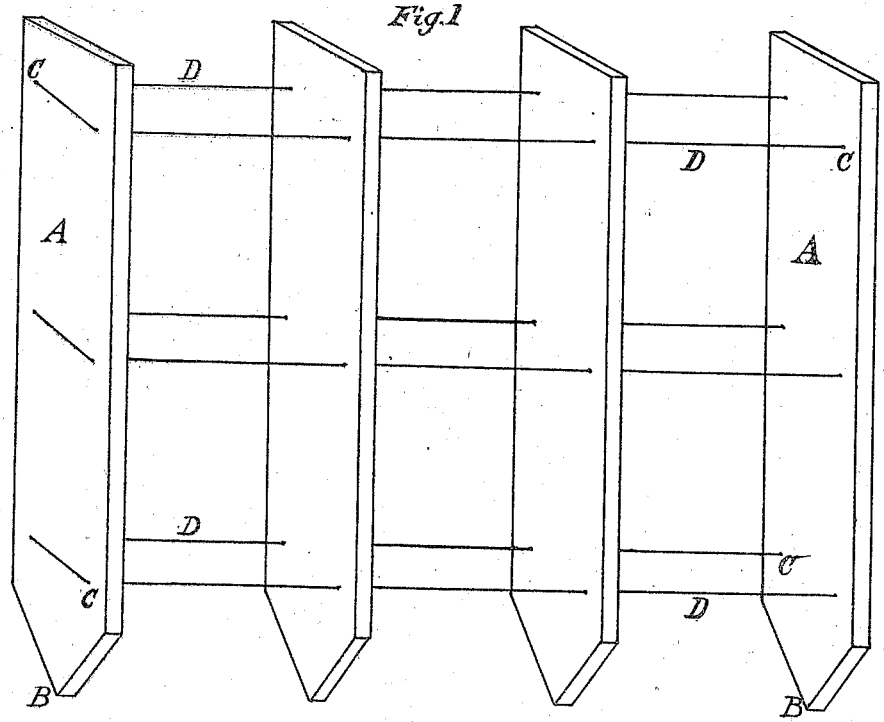
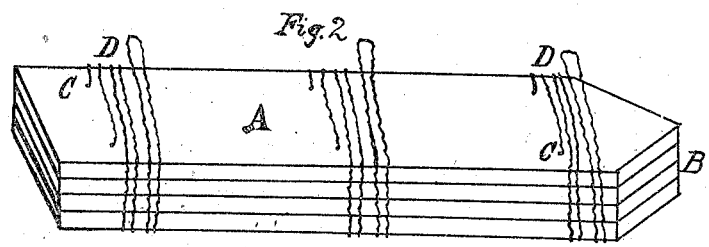
WITNESSES.
S. K. Smith
H. C. Brannin
INVENTOR.
Jane Page Crutcher
by Beattie and Fible
Her Attorneys

UNITED STATES PATENT OFFICE.

JANE PAGE CRUTCHER, OF FRANKLIN COUNTY, KENTUCKY.

VINE-SUPPORT.

SPECIFICATION forming part of Letters Patent No. 358,596, dated March 1, 1887.

Application filed September 17, 1886. Serial No. 213,806. (No model.)

*To all whom it may concern:*

Be it known that I, JANE PAGE CRUTCHER, a citizen of the United States, residing in the county of Franklin and State of Kentucky, have invented a certain new and useful Improvement in Vine-Supporters, of which the following is a full, clear, and exact description, reference being had to the accompanying drawings, forming part of this specification.

My improvement is designed to give secure even support to the vines in the cultivation of which it is used, to afford them the utmost freedom to develop by supplying a maximum surface on which the shoots may run, to train them with regularity in the form of an open frame-work, so as to increase the facility with which their fruit may be gathered, and to obviate the inconvenience which attends the handling and preservation during the unseasonable part of the year of the crude supporters now in vogue.

My improvement consists, generally, of several adjustable standards perforated with holes in parallel sets of two each, through which extend parallel lines, which serve as supports and trainers for the vines and as connecting-ligaments between the standards.

Figure 1 is a perspective view of my improvement when set up ready for use. Fig. 2 is a perspective view of the same when folded ready for portage or storage.

Like letters of reference indicate like parts in each figure.

A is a standard for staking in the ground and standing erect and firm.

B is the point of the standard A as ordinarily to be constructed for staking.

C is a hole perforating the standards A at right angles with their length and horizontally with their sides. The holes are grouped in pairs, C C, at some distance from each other, each at the same relative distance from opposite points of the standards, so that the lines passing through them will be considerably separated and parallel.

D is a line for supporting the vines and holding together the standards A, passing through the holes C.

There may be any number of standards which convenience or circumstances may require, any number of holes arranged in sets, as indicated, or in any other way which will effectuate the same purpose, and consequently any number of lines.

I will describe the manner of constructing and operating my improvement when made with four standards and such sets of lines as appear in the accompanying drawings.

The lines D, after passing through the holes C C, are looped over the outer faces of the end standards A, so as to connect the end standards. The intermediate standards A, which have previously to the looping-in of the end standards been passed on the lines D, are left free to move up and down the lines toward either end standard. When about to be used, the intermediate standards can thus be adjusted at any desired distance between the end standards, which are to be arranged at such distance from each other as will hold the lines taut, and then all the standards are to be driven or set in the ground. When being prepared for portage or storage, the standards can be slid together and the lines wrapped around them, so as to make a compact bundle, as shown in Fig. 2.

My improvement can be used in cultivating peas, beans, and in short all sorts of trailing vines whatsoever.

What I claim as new, and desire to secure by Letters Patent, is—

A vine-support consisting of a series of standards, each having a series of holes along its opposite edges, and a series of lines passing through the holes in the opposite edges of the standards, whereby said standards may be moved nearer to or farther from each other on the lines, substantially as described, for the purpose set forth.

JANE PAGE CRUTCHER.

Witnesses:
N. B. SMITH,
JNO. ED. GRAVES.